(12) United States Patent
Kiefer et al.

(10) Patent No.: US 9,020,888 B1
(45) Date of Patent: Apr. 28, 2015

(54) DATA REPLICATING SYSTEMS AND DATA REPLICATION METHODS

(71) Applicant: Nectar Services Corp., Farmingdale, NY (US)

(72) Inventors: Matthew R. Kiefer, Seaford, NY (US); Daniel P. Martin, Williamsville, NY (US); Edmond Baydian, Massapequa, NY (US)

(73) Assignee: Nectar Services Corp., Farmingdale, NY (US)

( * ) Notice: Subject to any disclaimer, the term of this patent is extended or adjusted under 35 U.S.C. 154(b) by 144 days.

(21) Appl. No.: 13/844,320

(22) Filed: Mar. 15, 2013

Related U.S. Application Data

(60) Provisional application No. 61/620,243, filed on Apr. 4, 2012, provisional application No. 61/620,231, filed on Apr. 4, 2012, provisional application No. 61/620,238, filed on Apr. 4, 2012.

(51) Int. Cl.
G06F 17/30 (2006.01)
(52) U.S. Cl.
CPC .............................. G06F 17/30575 (2013.01)
(58) Field of Classification Search
USPC .................................................. 707/610, 634
See application file for complete search history.

(56) References Cited

U.S. PATENT DOCUMENTS

| | | | |
|---|---|---|---|
| 5,568,471 A | 10/1996 | Hershey | |
| 5,745,753 A * | 4/1998 | Mosher, Jr. | 707/610 |
| 5,822,523 A | 10/1998 | Rothschild | |
| 6,145,001 A | 11/2000 | Scholl | |
| 6,363,421 B2 | 3/2002 | Barker | |
| 6,516,325 B1 * | 2/2003 | Blanchard et al. | 707/610 |

(Continued)

FOREIGN PATENT DOCUMENTS

| | | |
|---|---|---|
| WO | 9946692 A2 | 9/1999 |
| WO | 0175633 A1 | 10/2001 |

OTHER PUBLICATIONS

S. H. Schwartz and D. Zager. Value-Oriented Network Management. IEEE, 2000.

(Continued)

*Primary Examiner* — Kim Nguyen
(74) *Attorney, Agent, or Firm* — Ronald Abramson; Lewis Baach plle

(57) ABSTRACT

Methods and systems for synchronizing data may enable a computer to synchronize data by connecting to a peer computer via a network connection. The computer may receive a remote table from the peer computer, wherein the remote table comprises an object comprising a vector. The computer may determine whether the object is present in a local table. When the object is present in the local table, the computer may determine whether the vector in the remote table and the vector in the local table match. When the vectors do not match, the computer may determine whether a record of a change to the object is present in a local transaction log. The computer may receive data from the peer computer indicating whether a record of a change to the object is present in a remote transaction log when the vectors do not match. The computer may replace the vector in the local table with the vector in the remote table and record a change to the object in the local transaction log when the record of the change to the object in the local transaction log is less recent than the record of the change to the object in the remote transaction log.

2 Claims, 16 Drawing Sheets

(56) References Cited

U.S. PATENT DOCUMENTS

| | | | |
|---|---|---|---|
| 6,581,108 B1 | 6/2003 | Denison | |
| 6,643,661 B2 | 11/2003 | Polizzi | |
| 6,643,670 B2 * | 11/2003 | Parham et al. | 707/610 |
| 6,654,748 B1 * | 11/2003 | Rabung et al. | 709/203 |
| 6,782,420 B1 | 8/2004 | Barrett | |
| 6,986,147 B2 | 1/2006 | Gooding | |
| 7,039,674 B1 | 5/2006 | Cha | |
| 7,058,423 B1 | 6/2006 | Ahmavaara | |
| 7,130,854 B2 | 10/2006 | Beadles | |
| 7,177,917 B2 | 2/2007 | Giotta | |
| 7,302,469 B2 | 11/2007 | Motoyama | |
| 7,328,145 B2 | 2/2008 | Jackson | |
| 7,414,663 B2 | 8/2008 | Hoshino | |
| 7,417,663 B2 | 8/2008 | Yang | |
| 7,430,261 B2 * | 9/2008 | Forest et al. | 375/364 |
| 7,612,654 B2 | 11/2009 | Bender | |
| 7,818,297 B2 * | 10/2010 | Peleg et al. | 707/625 |
| 8,180,971 B2 * | 5/2012 | Scott et al. | 711/141 |
| 8,566,326 B2 * | 10/2013 | Hu et al. | 707/745 |
| 8,751,443 B1 * | 6/2014 | McCline et al. | 707/610 |
| 2001/0046209 A1 | 11/2001 | Glassman | |
| 2002/0118396 A1 | 8/2002 | Kawai | |
| 2002/0165982 A1 | 11/2002 | Leichter | |
| 2002/0178235 A1 | 11/2002 | Ueno | |
| 2003/0225839 A1 | 12/2003 | Kopunovic | |
| 2004/0015540 A1 | 1/2004 | Solano | |
| 2004/0172465 A1 | 9/2004 | Shuster | |
| 2005/0093501 A1 | 5/2005 | Takahashi | |
| 2005/0102382 A1 | 5/2005 | MacGregor | |
| 2005/0114550 A1 | 5/2005 | Kushnick | |
| 2005/0220096 A1 | 10/2005 | Friskney | |
| 2005/0271047 A1 | 12/2005 | Huonder | |
| 2006/0007944 A1 | 1/2006 | Movassaghi | |
| 2006/0029083 A1 | 2/2006 | Kettlewell | |
| 2006/0109797 A1 | 5/2006 | Ishida | |
| 2006/0182123 A1 | 8/2006 | Monette | |
| 2006/0211420 A1 | 9/2006 | Ophir | |
| 2006/0218267 A1 | 9/2006 | Khan | |
| 2007/0081530 A1 | 4/2007 | Nomura | |
| 2007/0143842 A1 | 6/2007 | Turner | |
| 2007/0150597 A1 | 6/2007 | Hasan | |
| 2007/0165540 A1 | 7/2007 | Elias | |
| 2008/0049621 A1 | 2/2008 | McGuire | |
| 2008/0071893 A1 | 3/2008 | Ohhira | |
| 2008/0228908 A1 | 9/2008 | Link | |
| 2008/0297307 A1 | 12/2008 | Parker | |
| 2009/0016270 A1 | 1/2009 | Tsirtsis (Georgios) | |
| 2009/0177863 A1 | 7/2009 | Rehman | |
| 2010/0063852 A1 * | 3/2010 | Toll | 705/4 |
| 2013/0266227 A1 * | 10/2013 | Ding et al. | 382/197 |
| 2014/0247994 A1 * | 9/2014 | Ding et al. | 382/197 |

OTHER PUBLICATIONS

Ohta (Tokoyo Institute of Technology), Provider Independet IPv6 Addressing Architecture, Internet Draft, Mar. 1995, Japan.

Ferguson et al, WebSphere as an e-business server, IBM Systems Journal, vol. 40, No. 1, 2001, US.

Waldbusser, Remote Network Monitoring Management Information Base, Internet Draft, Oct. 8, 2003, Version 2, Femont California/US.

Solarwinds, ARNOC Solves Network Management Challenge by Extending Orion Network Performance Monitor Capabilities Across Various Network Topologies, 2006, US.

* cited by examiner

DATA REPLICATING SYSTEMS AND DATA REPLICATION METHODS

CROSS-REFERENCE TO RELATED APPLICATIONS

This application claims the benefit of the filing date of the following U.S. provisional patent applications: Ser. No. 61/620,231, Ser. No. 61/620,238, and 61/620,243, each of which was filed on Apr. 4, 2012, and incorporates by reference herein each of said applications in their entirety.

BACKGROUND OF THE DISCLOSURE

1. Field of the Disclosure

The present disclosure is in the field of computer and/or telecommunications network management.

2. Background of the Related Art

Numerous tools exist for monitoring and managing events on a network. Such tools are used extensively in Network Operations Centers (NOCs).

In managing complex network infrastructures, some level of redundancy is desirable at the higher levels of the management infrastructure, to be able to continue in the event of a failure of a high-level control element. One problem that has arisen in such installations is that of efficiently and reliably synchronizing data among the control elements.

SUMMARY OF THE DISCLOSURE

In one aspect, methods and systems for synchronizing data may enable a computer to synchronize data by connecting to a peer computer via a network connection. The computer may receive a remote table from the peer computer, wherein the remote table comprises an object comprising a vector.

In another aspect, the computer may determine whether the object is present in a local table. When the object is present in the local table, the computer may determine whether the vector in the remote table and the vector in the local table match. When the vectors do not match, the computer may determine whether a record of a change to the object is present in a local transaction log. The computer may receive data from the peer computer indicating whether a record of a change to the object is present in a remote transaction log when the vectors do not match. The computer may replace the vector in the local table with the vector in the remote table and record a change to the object in the local transaction log when the record of the change to the object in the local transaction log is less recent than the record of the change to the object in the remote transaction log.

In one embodiment, a method is provided for synchronizing data, comprising, connecting, with a computer, to a peer computer via a network connection; receiving, with the computer, a remote table from the peer computer, wherein the remote table comprises an object comprising a vector; determining, with the computer, whether the object is present in a local table; determining, with the computer, whether the vector in the remote table and the vector in the local table match when the object is present in the local table; determining, with the computer, whether a record of a change to the object is present in a local transaction log when the vectors do not match; receiving, with the computer, data from the peer computer indicating whether a record of a change to the object is present in a remote transaction log when the vectors do not match; and replacing, with the computer, the vector in the local table with the vector in the remote table and recording, with the computer, a change to the object in the local transaction log when the record of the change to the object in the local transaction log is less recent than the record of the change to the object in the remote transaction log.

In another embodiment, the object comprises a conflict flag; and the method further comprises flagging, with the computer, the conflict flag in the local table to indicate a conflict when the vectors do not match.

In another embodiment, the method further comprises generating, with the computer, an alarm when the vectors do not match.

In another embodiment, the method further comprises changing the vector in the local table; and recording the change to the vector in the local transaction log.

In another embodiment, the method further comprises recording, with the computer, the record of the change to the object in the remote transaction log into the local transaction log when the vectors do not match.

In another embodiment, the method further comprises recording, with the computer, object data from the local table in the local transaction log when the vectors do not match.

In another embodiment, the record of the change to the object in the remote transaction log comprises peer conflict data indicating a conflict when a change to the vector in the remote table has been made and a different change to the vector in a table associated with a third computer has been made.

In another embodiment, the method further comprises determining, with the computer, a plurality of peer computers with which to synchronize; and selecting, with the computer, one of the plurality of peer computers to which to connect.

In another embodiment, the method further comprises setting, with the computer, a mutex flag when the connection to the peer computer is made; and receiving, with the computer, a ready message from the peer computer.

In another embodiment, the method further comprises adding, with the computer, the object to the local table when the object is not present in the local table.

In another embodiment, the object further comprises a key.

In another embodiment, the method further comprises the object further comprises a delete flag.

In another embodiment, the method further comprises replacing, with the computer, a delete flag in the local table with a delete flag in the list.

Further disclosed is a computer, comprising a database constructed and arranged to store a local table and a local transaction log; and a processor in communication with the database constructed and arranged to: connect to a peer computer via a network connection; receive a remote table from the peer computer, wherein the remote table comprises an object comprising a vector; determine whether the object is present in the local table; determine whether the vector in the remote table and the vector in the local table match when the object is present in the local table; determine whether a record of a change to the object is present in a local transaction log when the vectors do not match; receive data from the peer computer indicating whether a record of a change to the object is present in a remote transaction log when the vectors do not match; and replace the vector in the local table with the vector in the remote table and record a change to the object in the local transaction log when the record of the change to the object in the local transaction log is less recent than the record of the change to the object in the remote transaction log.

In another embodiment of the computer, the object comprises a conflict flag; and the processor is further constructed and arranged to flag the conflict flag in the local table to indicate a conflict when the vectors do not match.

In another embodiment of the computer, the processor is further constructed and arranged to generate an alarm when the vectors do not match.

The computer may further comprise a display; wherein the processor is constructed and arranged to cause the display to display the alarm.

In another embodiment of the computer, the processor is further constructed and arranged to: change the vector in the local table; and record the change to the vector in the local transaction log.

In another embodiment of the computer, the processor is further constructed and arranged to record the record of the change to the object in the remote transaction log into the local transaction log when the vectors do not match.

In another embodiment of the computer, the processor is further constructed and arranged to record object data from the local table in the local transaction log when the vectors do not match.

In another embodiment of the computer, the record of the change to the object in the remote transaction log comprises peer conflict data indicating a conflict when a change to the vector in the remote table has been made and a different change to the vector in a table associated with a third computer has been made.

In another embodiment of the computer, the processor is constructed and arranged to record the change to the vector in the local table by receiving a record of a change to the vector in the remote table from the peer computer and recording the record in the database.

In another embodiment of the computer, the processor is further constructed and arranged to: determine a plurality of peer computers with which to synchronize; and select one of the plurality of peer computers to which to connect.

In another embodiment of the computer, the processor is further constructed and arranged to: set a mutex flag when the connection to the peer computer is made; and receive a ready message from the peer computer.

In another embodiment of the computer, the processor is further constructed and arranged to add the object to the local table when the object is not present in the local table.

In another embodiment of the computer, the object further comprises a key.

In another embodiment of the computer, the object further comprises a delete flag.

In another embodiment of the computer, the processor is further constructed and arranged to replace a delete flag in the local table with a delete flag in the list.

DETAILED DESCRIPTION OF SEVERAL EMBODIMENTS

Computers may be linked to one another via a network or networks. A computer may be any programmable machine capable of performing arithmetic and/or logical operations. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, and other terms. It will be understood by those of ordinary skill that those terms used herein are interchangeable, and any computer capable of performing the described functions may be used. For example, though the term "server" may appear in the following specification, the disclosed embodiments are not limited to servers.

A network may be any plurality of completely or partially interconnected computers wherein some or all of the computers are able to communicate with one another. It will be understood by those of ordinary skill that connections between computers may be wired in some cases (i.e. via Ethernet, coaxial, optical, or other wired connection) or may be wireless (i.e. via WiFi, WiMax, or other wireless connection). Connections between computers may use any protocols, including connection oriented protocols such as TCP or connectionless protocols such as UDP. Any connection through which at least two computers may exchange data can be the basis of a network. Some networks, such as those shown in FIGS. 3A-3C, may be geographically spread out, with nodes 150 located in data centers 310 in various locations. The nodes 150 may each comprise one or more servers. Nodes 150 may be arranged into logical groups such as hives, which may correspond to data center 310 placement or may be based on some other grouping scheme. Individual computers attempting to connect to network servers may connect to one or more nodes 150 associated with a particular logical group. In some cases, nodes 150, data centers 310, and/or hives may become disconnected from one another due to internal and/or external failures. In some cases, this may result in two or more separate but functional networks wherein two or more hives are isolated from one another, forming separate network cores. Changes made to data on one of the two or more separated hives may cause data inconsistencies when the failures are corrected and the networks are reunited into a single network. As will be described in greater detail below, systems and methods described herein may enable data to be automatically synchronized across computers in a network.

Figure 1A:
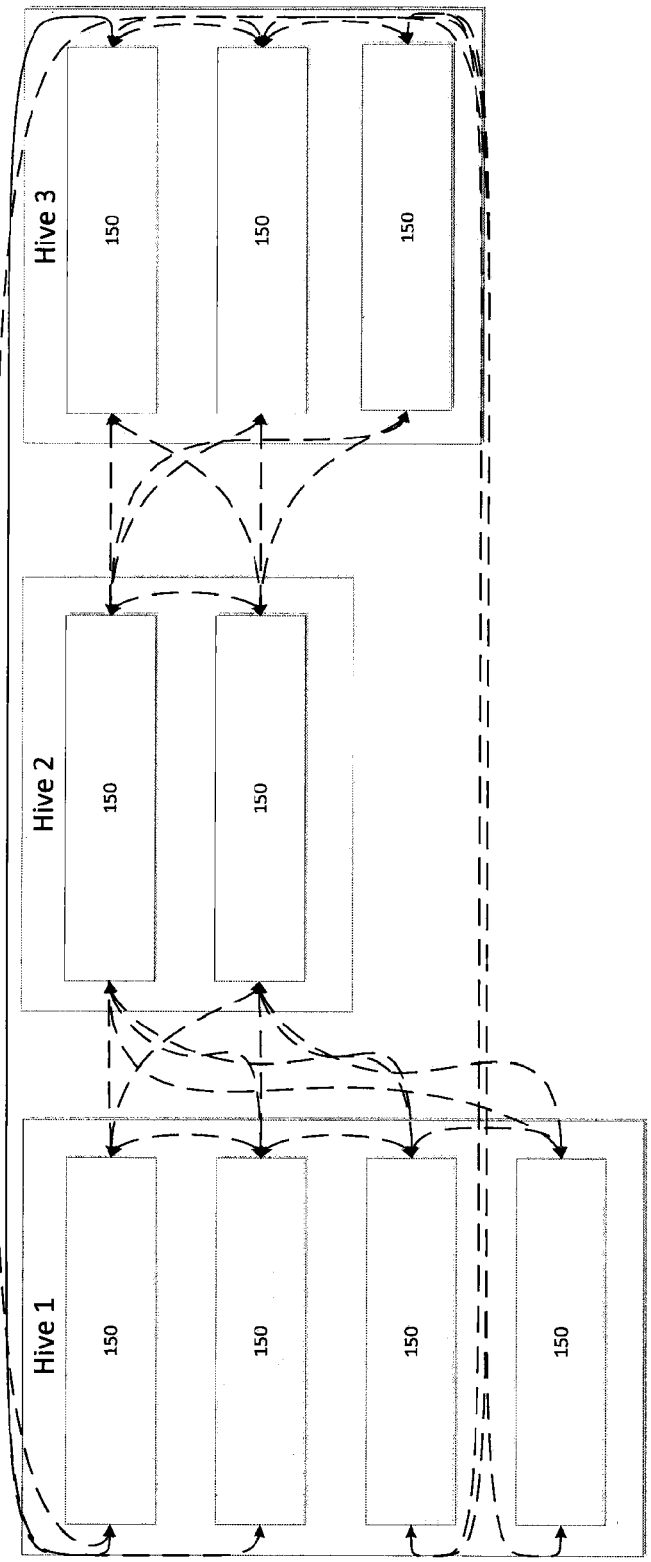
FIG. 1A depicts a network cluster according to an embodiment of the disclosure.
Figure 1B:
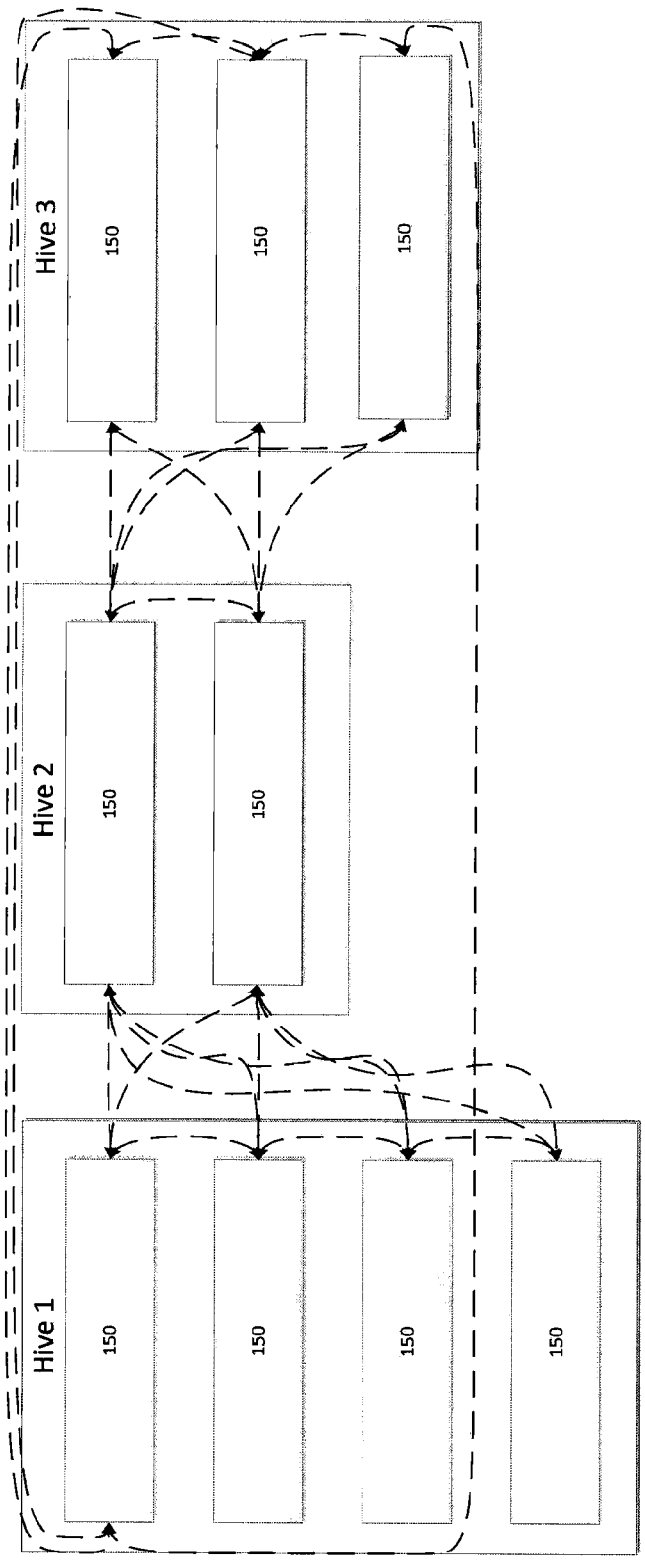
FIG. 1B depicts a network cluster according to an embodiment of the disclosure.

FIG. 1A depicts a network cluster 100 according to an embodiment of the disclosure. The cluster 100 may comprise a plurality of interconnected nodes 150. The nodes 150 may each comprise one or more servers. In this example network cluster 100, each node 150 may be directly connected to every other node 150 such that data may be transferred between any node 150 in any direction without passing through an intermediate node 150. In some cases, some nodes 150 may not have direct connections to one another. For example, FIG. 1B depicts a network cluster 100 according to an embodiment of the disclosure that is similar to the cluster 100 of FIG. 1A, but without direct connection between every node 150. In the case of FIG. 1B, nodes 150 that are not directly connected may maintain connections with one another by passing data through intervening nodes 150.

Figure 2:
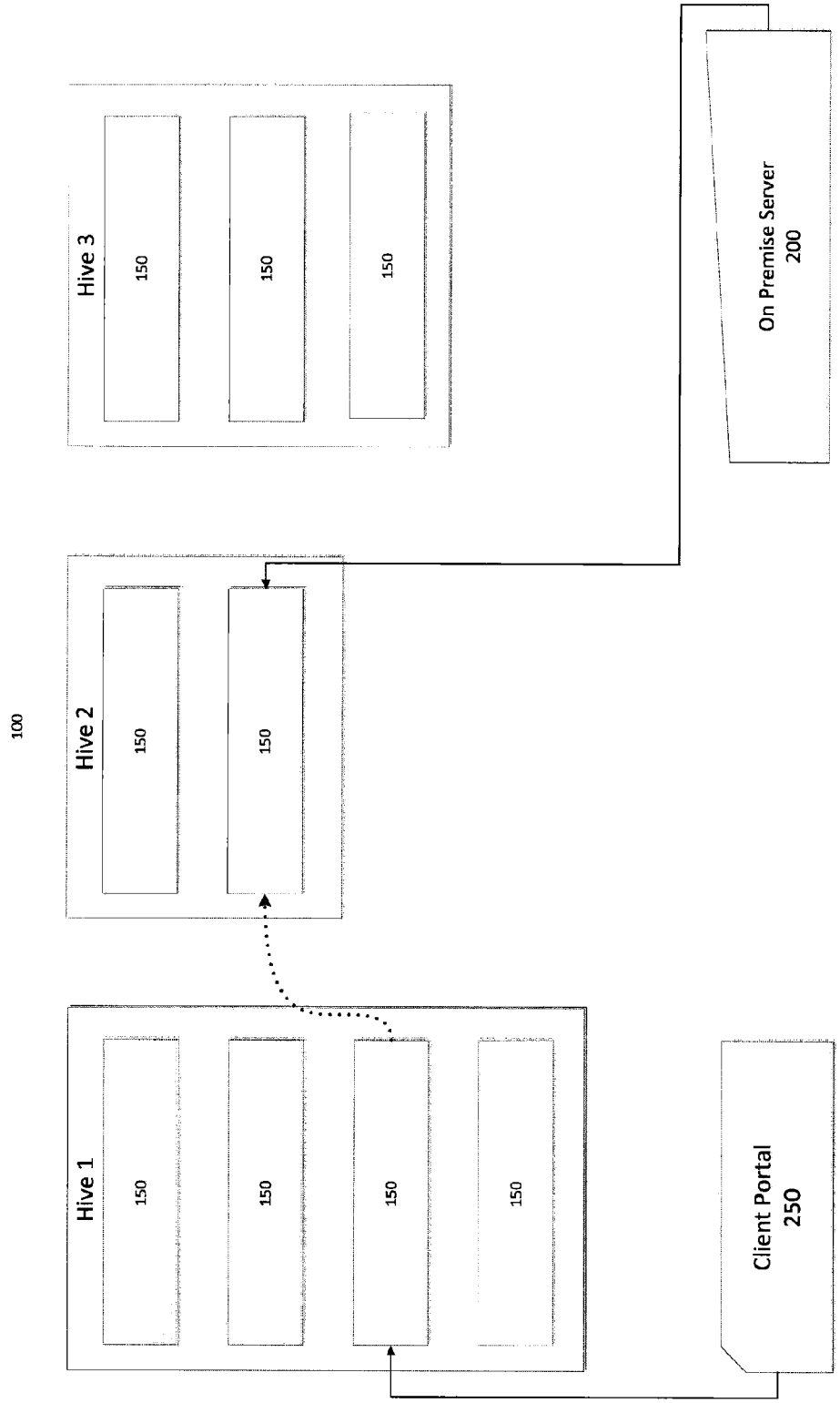
FIG. 2 depicts a network cluster including client and server connections according to an embodiment of the disclosure.

FIG. 2 depicts a network cluster 100 including client and server connections according to an embodiment of the disclosure. An on-premise server 200 (OPS) may be a server that is connected to a node 150 and logically grouped within the node 150. OPSs 200 may be physically on the premises of a facility that houses servers that are part of a node 150, or they may be geographically spread out and remotely connected. A node 150 may comprise one or more computers such as OPSs 200, and OPSs 200 connected to a node 150 may be in the same location or spread out. An individual OPS 200 may be associated with one node 150. A client 250 may be a remote computer capable of connecting to the network cluster 100. The client 250 may connect to one node 150 within the cluster 100. The client 250 may connect to the node 150 in any way, for example via the Internet or another network or through a direct or wireless connection. In embodiments wherein a client 250 connects to a node 150 via the Internet or other network, data may be shared by the client 250 and other computers within the cluster 100 without requiring additional firewall or security permissions for the client 250 beyond those necessary to access the Internet or other network.

A client 250 that is connected to a node 150 may be able to access data on any OPS 200 associated with any node 150, even a different node 150 from the one to which the client 250 is connected. For example, the client 250 may be able to communicate with the OPS 200 in FIG. 2, even though the client 250 and OPS 200 are connected to different nodes 150 within the cluster 100. Those of ordinary skill in the art will recognize that in some cases a client 250 may be restricted from accessing certain nodes 150, OPSs 200, and/or data due to access policies, security settings, or the like.

Figure 3A:
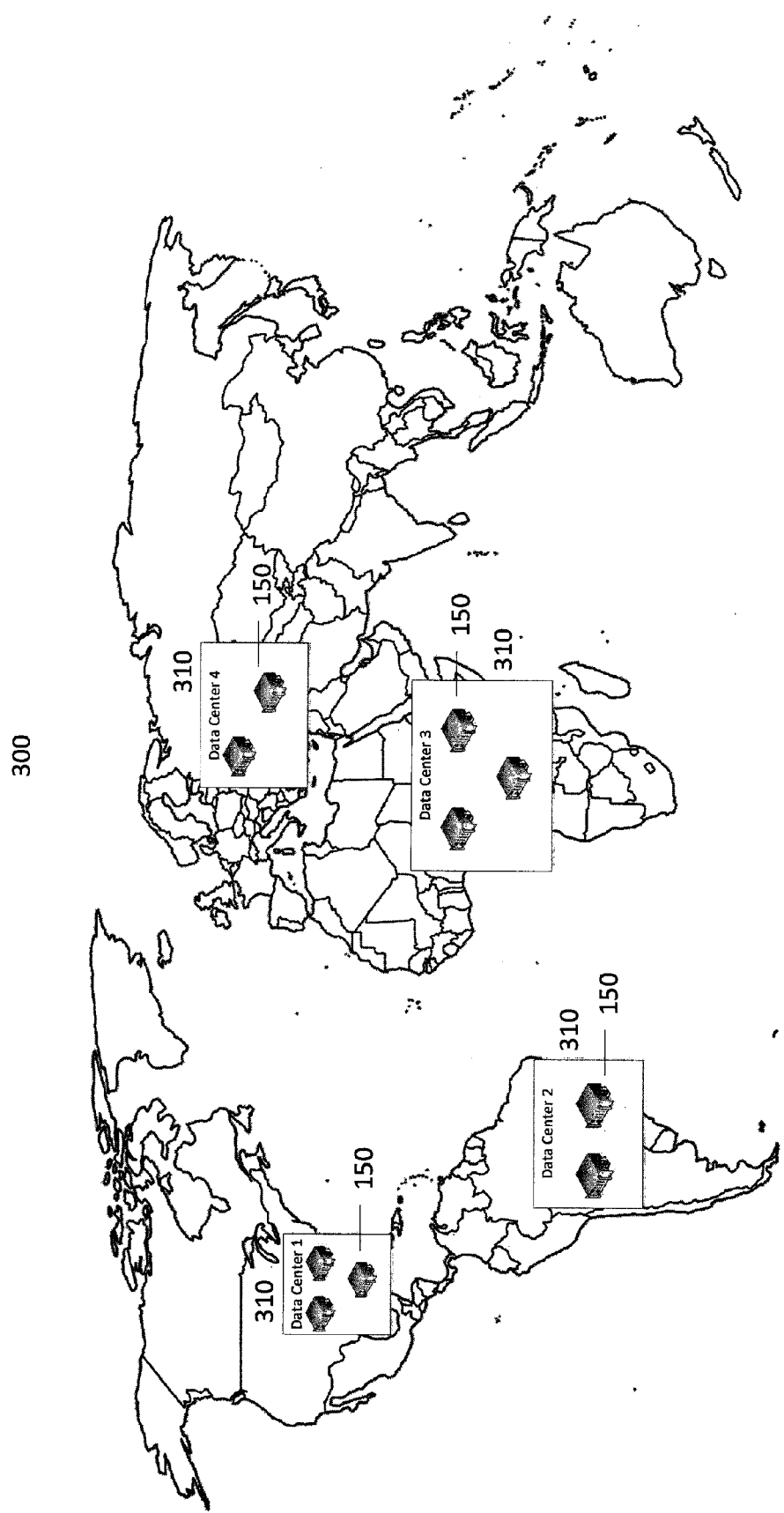
FIG. 3A depicts a plurality of network nodes according to an embodiment of the disclosure.
Figure 3B:
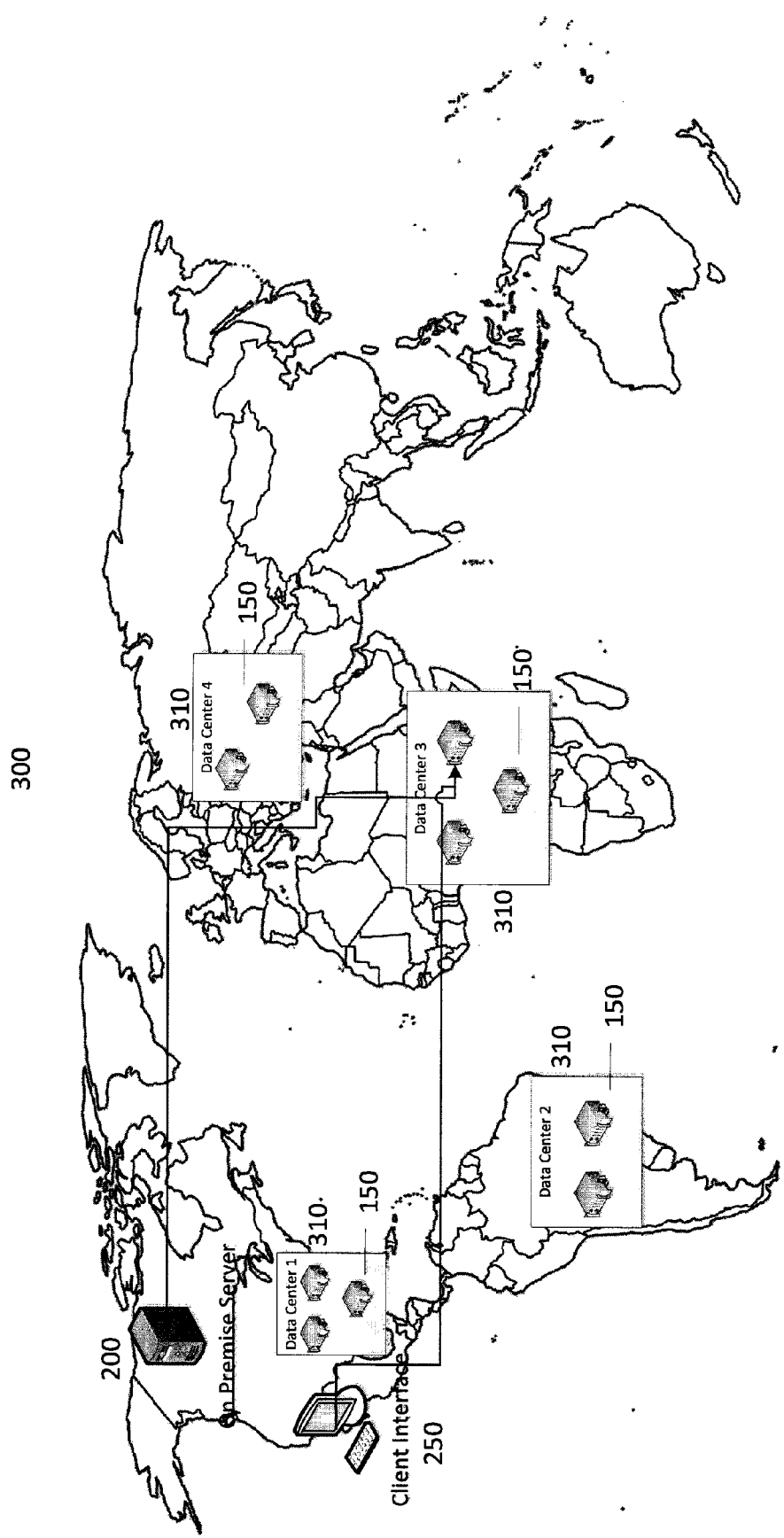
FIG. 3B depicts a plurality of network nodes including client and server connections according to an embodiment of the disclosure.
Figure 3C:
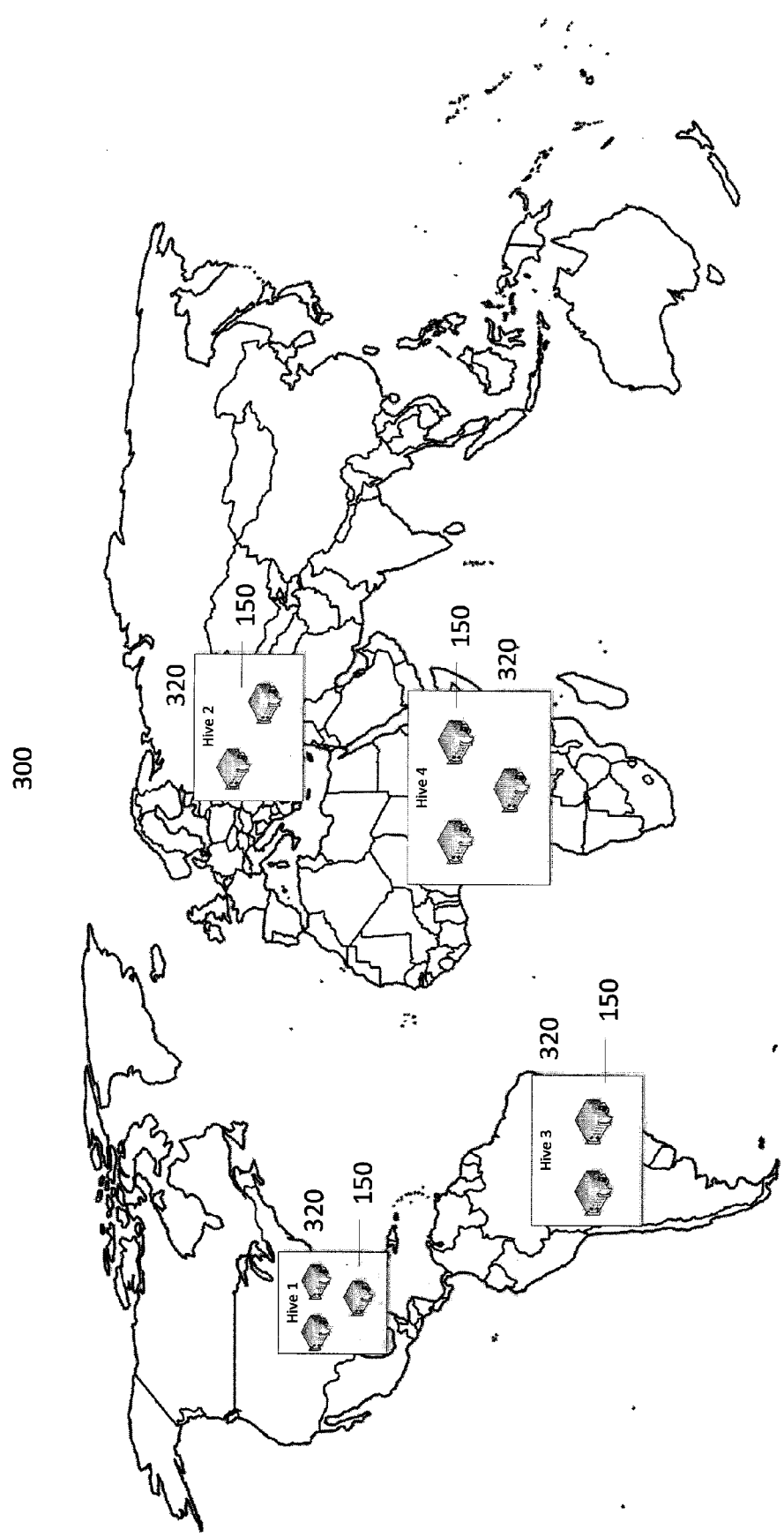
FIG. 3C depicts a plurality of network hives according to an embodiment of the disclosure.

FIGS. 3A-3C provide examples of networks 300 according to embodiments of the disclosure. FIG. 3A depicts a plurality of network nodes 150 according to an embodiment of the disclosure. In this example, nodes 150 are deployed within a plurality of data centers 310. The data centers 310 may be geographically spread out, as shown, and may contain any number of nodes 150. Four data centers 310, each having two or three nodes 150, are shown. However, a network 300 may comprise any number of data centers 310, and data centers 310 may comprise any number of nodes 150. The data centers 310, and the nodes 150 within, may be interconnected to one another as described with respect to FIGS. 1A-2 above or in any other way.

Spreading nodes 150 across multiple data centers 310 may provide resiliency for the network 300. If problems arise at one or more data centers 310, other data centers 310 may be capable of continued operation. As explained above with respect to FIG. 1B, nodes 150 (and therefore data centers 310) that are not directly connected due to data center 310 or node 150 problems may maintain connections with one another through intervening nodes 150.

FIG. 3B depicts a plurality of network nodes 150 including client and server connections according to an embodiment of the disclosure. In this example, a OPS 200 and client 250 are connected to a node 150 in a data center 310 that is not the closest data center 310. In some cases this may be a desirable situation, for example if the nearest data center 310 is heavily loaded compared to a more distant data center 310 or unavailable altogether. However, in other situations it may be desirable for OPSs 200 and clients 250 to connect to the data center 310 that is nearest to them. In some embodiments, network 300 systems and methods may enable clients 250 and/or OPSs 200 to connect to specific nodes 150 or sets of nodes 150 to optimize load balancing, performance, or other criteria.

FIG. 3C depicts a plurality of network hives 320 according to an embodiment of the disclosure. Hives 320 are logical groupings of nodes 150. A hive 320 grouping may be determined by an administrator or other operator, a default setting, automatically by a computer, or in any other way. A hive 320 may comprise nodes 150 grouped in any fashion, but in the example of FIG. 3C the nodes 150 in each data center 310 are grouped into hives 320.

Figure 4A:
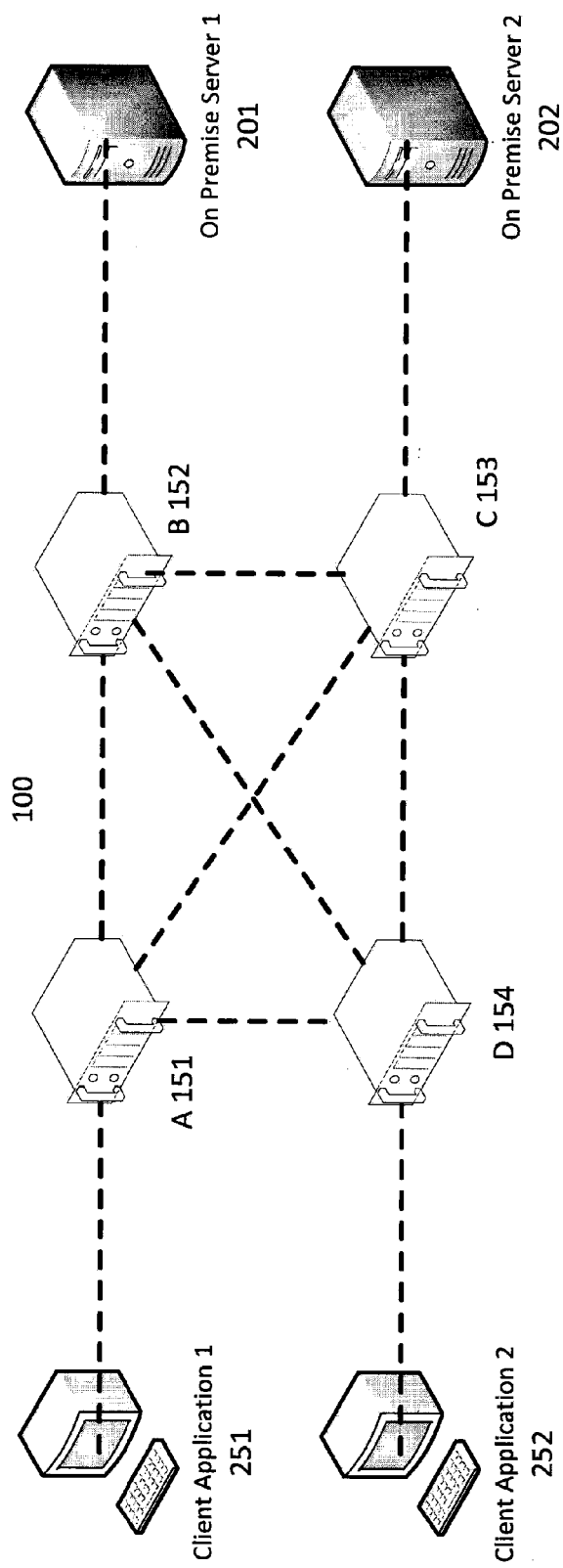
FIG. 4A depicts an interconnected network according to an embodiment of the disclosure.
Figure 4B:
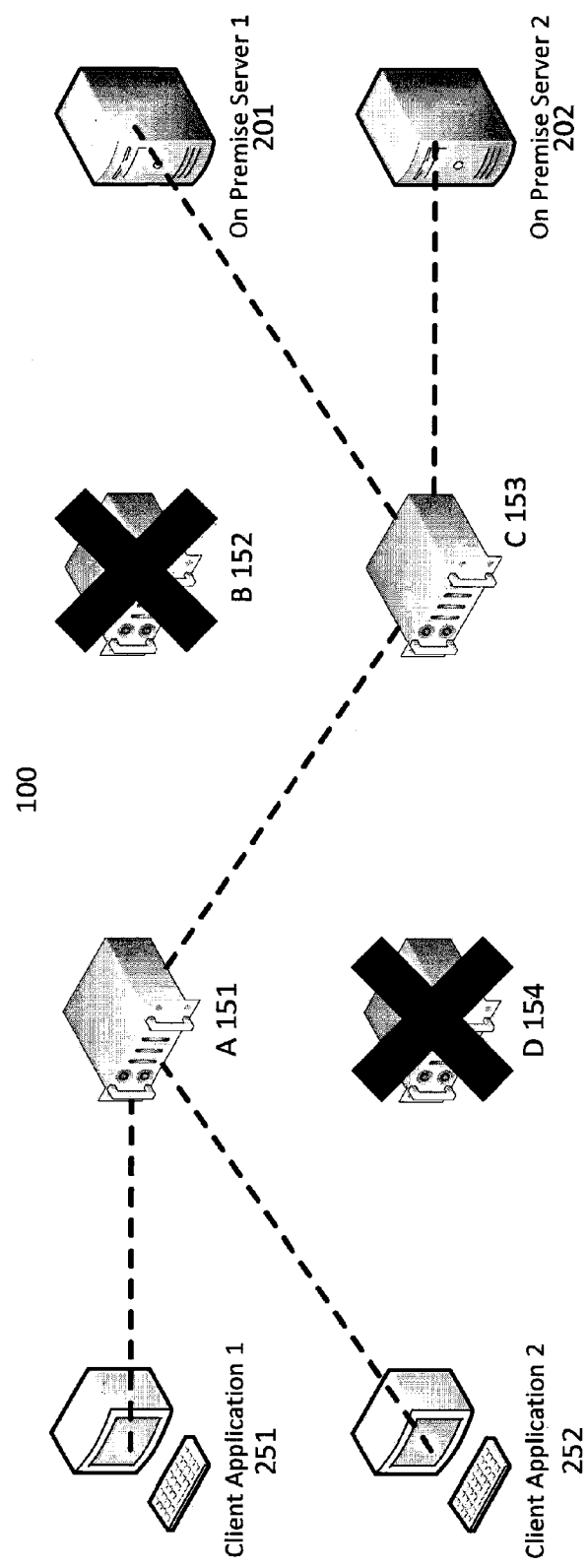
FIG. 4B depicts a partially interconnected network according to an embodiment of the disclosure.
Figure 4C:
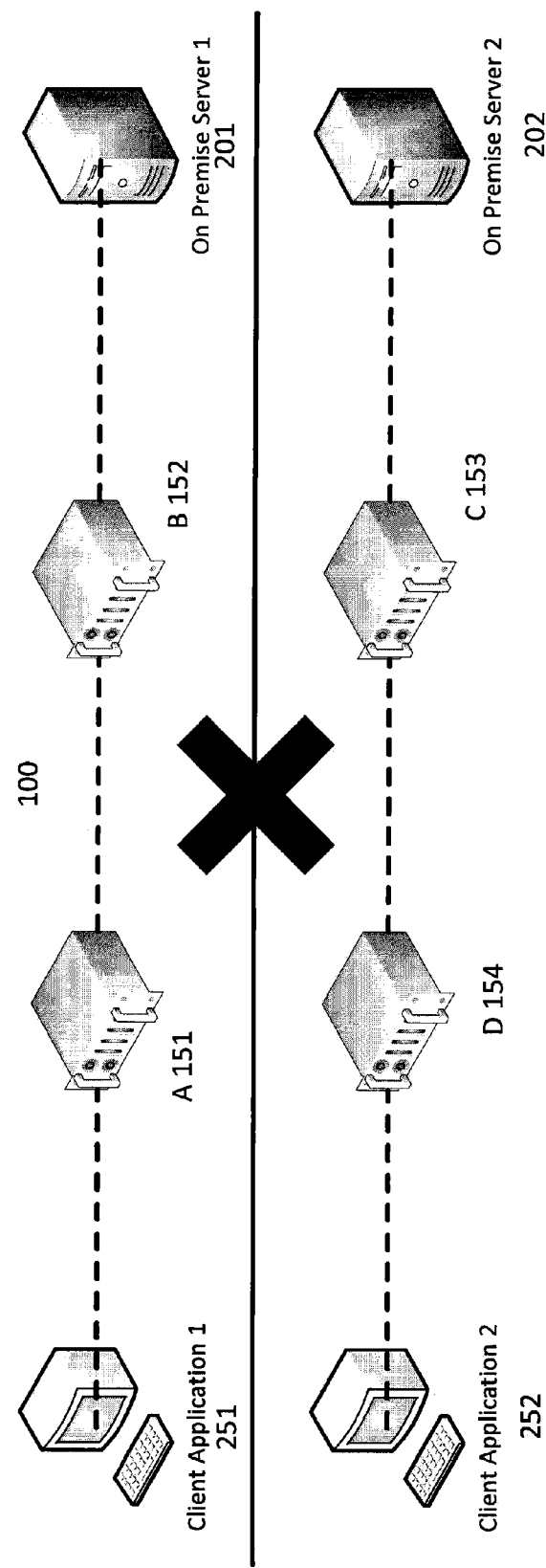
FIG. 4C depicts a network separated into a plurality of separate cores according to an embodiment of the disclosure.

FIGS. 4A-4C depict networks according to an embodiment of the disclosure. The networks of FIGS. 4A-4C comprise a network cluster 100 comprising four nodes 151-154, two OPSs 201-202, and two clients 251-252. While some networks may have this exact configuration, others may not. These networks are intended to be representative of any network according to embodiments of the disclosure and to explain connectivity among computers within any network. For example, these nodes 151-154, OPSs 201-202, and clients 251-252 may be nodes 150, OPSs 200, and clients 250 as shown in FIGS. 1A-2. The nodes 150 may be arranged in data centers 310 and/or hives 320 as shown in FIGS. 3A-3C. FIG. 4A depicts an interconnected network, and FIGS. 4B and 4C depict networks with lost connectivity among at least some of the network's computers, wherein connectivity may be affected by problems within the network or external problems. As will be described in greater detail below, connectivity losses may cause data synchronization issues if data changes on one or more computers while the computers are not interconnected.

FIG. 4A depicts an interconnected network according to an embodiment of the disclosure. As described above, each of the nodes 151-154 may be interconnected so that each node 151-154 may communicate with any other node 151-154. Clients 251-252 and OPSs 201-202 may connect to any node 151-154 and thereby be able to communicate with any computer in the network cluster 100, depending on permissions. For example, in FIG. 4A client 1 251 is connected to node A 151, client 2 252 is connected to node D 154, OPS 1 201 is connected to node B 152, and OPS 2 202 is connected to node C 153, although other configurations are possible. In FIG. 4A, the network cluster 100 is intact, and any computer may talk to any other computer.

FIG. 4B depicts a partially interconnected network according to an embodiment of the disclosure. In this example, nodes B 152 and D 154 are experiencing outages preventing them from connecting to other computers in the network cluster 100. Outages may occur for any reason, and may be related to internal problems with the nodes 152, 154, local problems in the nodes' 152, 154 geographic area, or some other problems. Computers that had been connected to nodes B 152 and D 154 may be connected to other nodes 151, 153.

The network cluster 100 may be able to maintain connectivity between all available computers. In some cases, network problems may eventually be fixed. When the problems are fixed, the network cluster 100 may return to its fully interconnected state, such as that shown in FIG. 4A in this example.

FIG. 4C depicts a network separated into a plurality of separate cores according to an embodiment of the disclosure. In this case, problems with the network may cause the network cluster 100 to be split into separate cores 101-102. A core 101-102 may be an intact subset of the network cluster 100 that has become cut off from all communication with another intact subset of the network cluster 100. The cores 101-102 may function as networks, interconnecting the various computers communicating with the core 101-102, but they may be unable to communicate with computers in a different core 101-102. In some cases, fracturing into cores may be due to problems which may eventually be fixed. When the problems are fixed, the network cluster 100 may return to its fully interconnected state, such as that shown in FIG. 4A in this example. Changes to data made on one core 101 during a network fracture may not be known to the other core 102 unless data is synchronized in some way when the network cluster 100 returns to an interconnected state.

Figure 5:
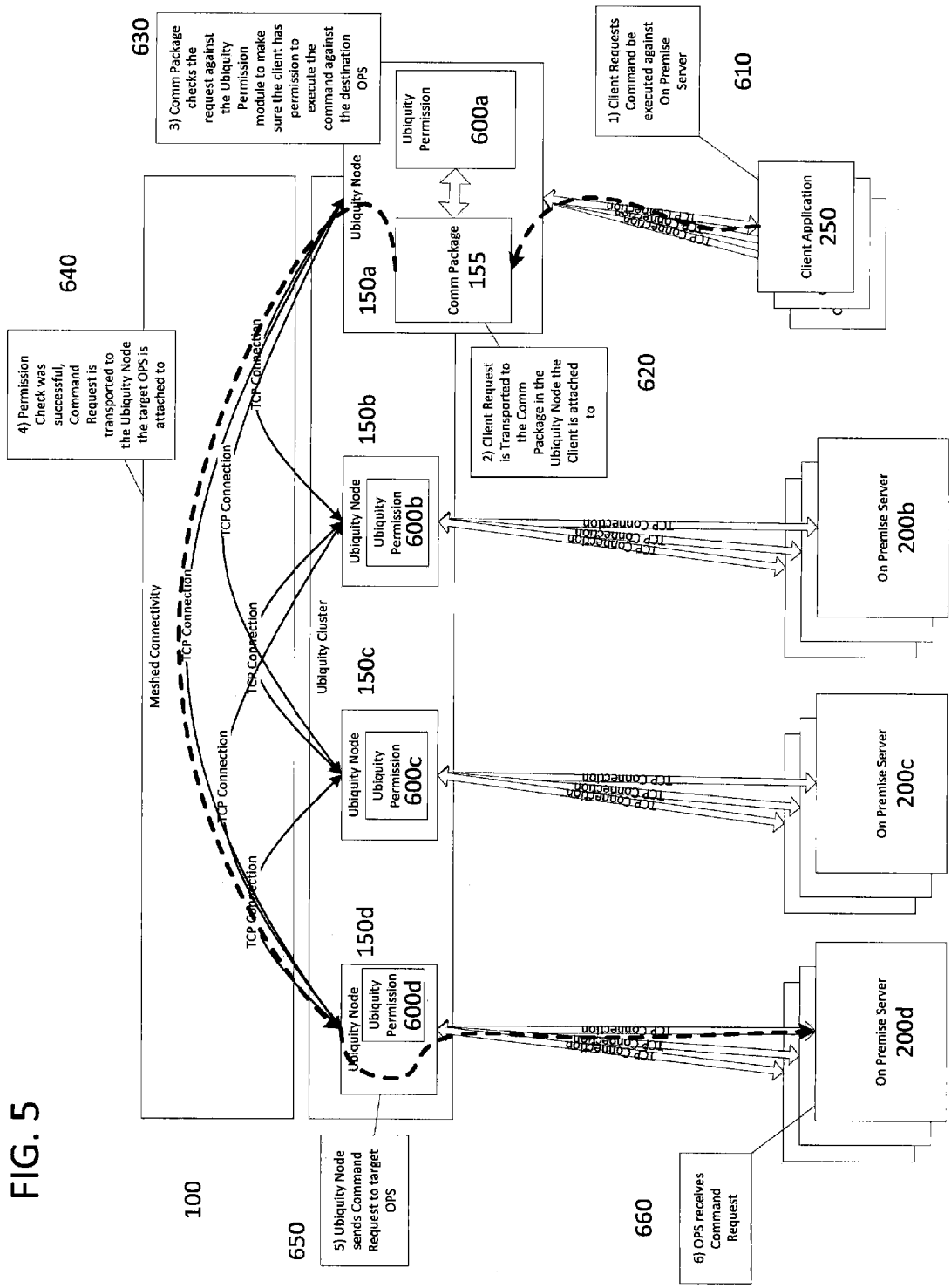
FIG. 5 depicts a network and a network communication process according to an embodiment of the disclosure.

FIG. 5 depicts a network and a network communication process according to an embodiment of the disclosure. FIG. 5 illustrates how permission information may be used within a network cluster 100. Permission information may be, for example, username and/or password data associated with a client 250, user, or other entity. In the situation illustrated by FIG. 5, a client 250 may request a computer associated with a node 150a to execute a command against a OPS 200d in the network 610. The request may be communicated to a communication package 155 associated with the node 150a (for example, a communication package 155 may be hardware and/or software for sending, receiving, and/or processing communications) 620. The communication package 155 may check the request against a permission module 600a to determine whether the client 250 has permission to execute the command against the OPS 200d (for example, a permission module 600a-600d may be a database containing permission data) 630. Note that every node 150a-150d in the cluster 100 may have a communication package 155 and/or a permission module 600a-600d. If the permission check 630 is successful, the command request may be transmitted to the node 150d with which the OPS 200d is associated 640. The node 150d may transmit the command request to the OPS 200d of interest 650, and the OPS 200d may receive the command 660 and may execute it.

Within the network cluster 100, some types of information may have one official source. For example, data for each node 150a-150d, such as identification data, address data, and/or the like, may be determined by one central source and may be distributed to all computers in the network cluster 100. Therefore, if one computer becomes cut off from the network cluster 100 (see FIG. 4B) or if the network cluster 100 becomes fragmented (see FIG. 4C), the data may be restored from the central source upon reconnection. The data may be sent directly from the central source or may be shared through cluster gossip, wherein other computers in the network cluster 100 share their information (which may ultimately be from the central source) with the reconnected computer. Some other types of information may not have a central source. In many embodiments permission information may be set by individual nodes 150a-150d or OPSs 200b-200d to which clients 250 are connected. For example, a client 250 may request a password change and the local node 150a may process the request, or a node 150a may change access restrictions for a client 250 connected to the node 150a.

Figure 6:
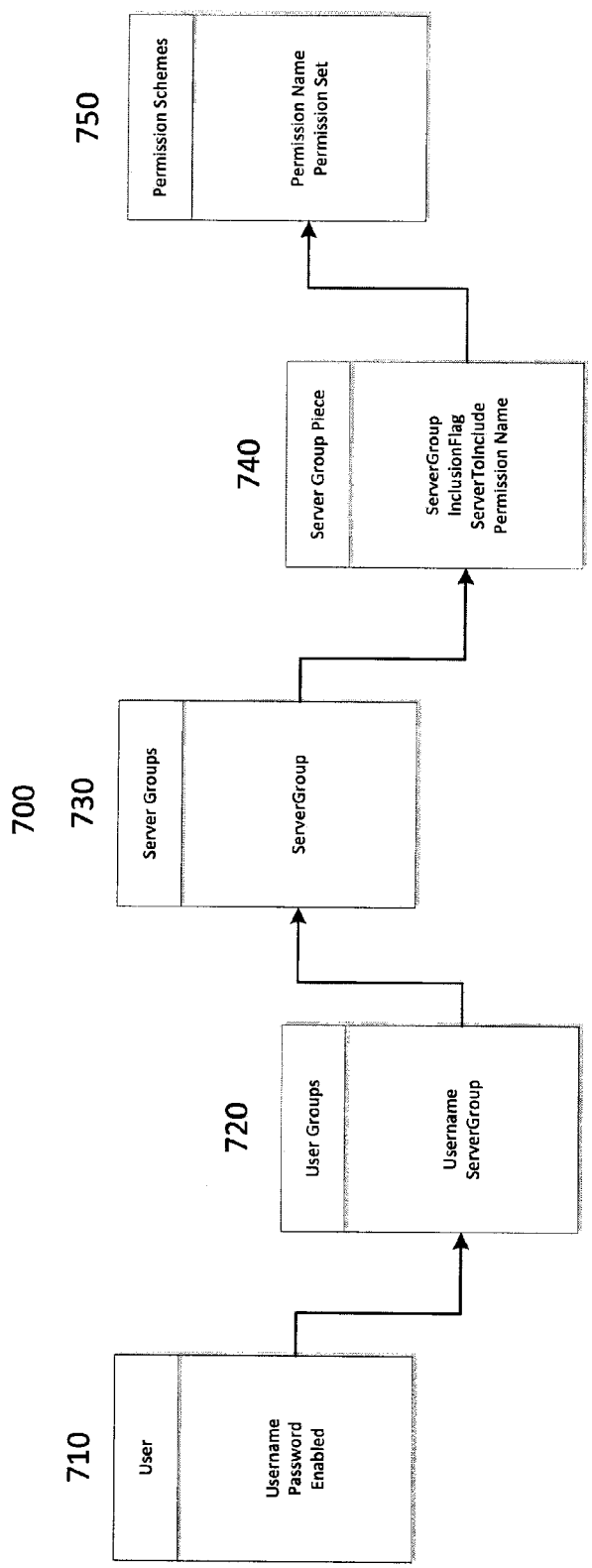
FIG. 6 depicts a permission table according to an embodiment of the disclosure.

FIG. 6 depicts a permission table 700 according to an embodiment of the disclosure. The permission table 700 may contain permission information that may be configurable by a plurality of computers in a network cluster 100. For example, a permission table 700 may contain user data 710 (for example usernames and/or passwords), user group data 720 (for example usernames and associated string values for one or more server groups in embodiments wherein a username can be a member of multiple server groups), server group data 730 (for example a list of server groups), server group piece data 740 (for example, data indicating which servers are in which groups and/or which permission sets are used for servers and/or groups), permission scheme data 750 (for example, permission sets, what permissions are available for various computers), and/or other data. Full or partial permission tables 700 may be stored and/or changed by various computers in a network, such as nodes 150 and/or OPSs 200. Examples of permission information may include usernames, passwords, account enablement data, server groups (for example the commands a particular client 250 may issue to a particular OPS 200 or group of OPSs 200), and other types of data. In some cases, permission information may include inclusion flags or other data that may enable tagging and/or linking of servers. For example, multiple servers with different server names may have their permission information customized individually or may be tagged as members of server groups, wherein permission information may be customized collectively for each member of the group. Various computers within a network cluster 100 may have full or partial permission tables 700. Because data in permission tables 700 may be changed locally and may not be subject to central control, situations may arise wherein different computers have conflicting data in their permission tables 700. Turning to the examples of FIGS. 4B and 4C, one such situation may be illustrated, although others are possible. If the situation of FIG. 4C occurs, changes may be made to a password associated with client 2 252 without node A 151 being aware of the changes. If the situation of FIG. 4B subsequently occurs, client 2 252 may try to connect to node A 151 but may have to use an old password, unless permissions can be replicated among the various computers in the network cluster 100. The following figures and discussion provide example embodiments for replicating permission or other localized data.

Data in the permission table 700 of FIG. 6 may be rationalized as objects with keys and payloads. Table 1 provides an example:

TABLE 1

Objects and Payloads

| Table | Key | Payload |
|---|---|---|
| User | Username | Username, Password, Enabled |
| User Groups | Username, ServerGroup | Username, ServerGroup |
| Server Groups | ServerGroup | ServerGroup |
| Server Group Piece | ServerGroup, Inclusion Flag, ServerToInclude | ServerGroup, Inclusion Flag, ServerToInclude |
| Permission Schemes | Permission Name | Permission Name, Permission Set |

An object may be a unit of data comprising at least a key and a payload. In the example of Table 1, each row of the table may represent an object. The following examples use a username as a key and a password as a payload. Changes to a password in one node's 150a-150d (for example, node 150b) table 700 may be made by an administrator at that node 150b or an administrative change made at another node 150a, 150c-150d within the cluster 100 propagating to the node 150b according to some replication process. As described below, a replication process may be carried out by every node 150a-150d in the cluster 100 periodically. Note that while node 150b is considered in the example above, the systems and methods described below may be performed by any server. Therefore, the following discussion is presented in the context of an arbitrary server, specifically the node 150 introduced in FIG. 1A, which may be in communication with other servers.

A vector field may be contained within each object. The vector field may comprise the name of the node 150 where the change originated and a scalar value associated with the specific object. The scalar value may increment every time a change is made to the object (for example every time the password is changed). The object may also contain a flag indicating whether there is a conflict present in the object (for example when the node 150 is aware that another node 150 has a different password for the same username). The object may also contain a flag indicating that the object has been deleted (and therefore may be ignored by any process using the data).

A transaction log may also be maintained for an object. When a change is made to an object, either through an administrative change, or through incorporating changes from other nodes 150, the updated object, including its vector field and payload, may be added to the transaction log. Each record in the transaction log may also contain a flag indicating where a series of conflicting payloads in the log begin and end. As will be explained with respect to FIG. 11 below, a transaction log may be used to determine if a node 150 has incorporated an object payload update from another computer in the network cluster 100 into its own object payload. Object data and/or transaction logs can be used for interaction with the network cluster 100 (for example during a user login or other action) and/or modified (for example by adding, modifying, deleting, and/or making some other change to a user and/or password). The following Tables 2 and 3 provide examples of object data and a transaction log for a server:

TABLE 2

Server A Object Data

| Key | Payload | Vector | Delete Flag |
|---|---|---|---|
| User1 | Password1 | ServerA:1 | No |
| User2 | Password2 | ServerA:1 | No |
| User3 | Password3 | ServerA:1 | No |

TABLE 3

Server A Transaction Log

| Sequence | Vector | Key | Payload | Delete Flag | Conflict Flag |
|---|---|---|---|---|---|
| 1 | ServerA:1 | User1 | Password1 | No | 0 |
| 2 | ServerA:1 | User2 | Password2 | No | 0 |
| 3 | ServerA:1 | User3 | Password3 | No | 0 |

Figure 7:
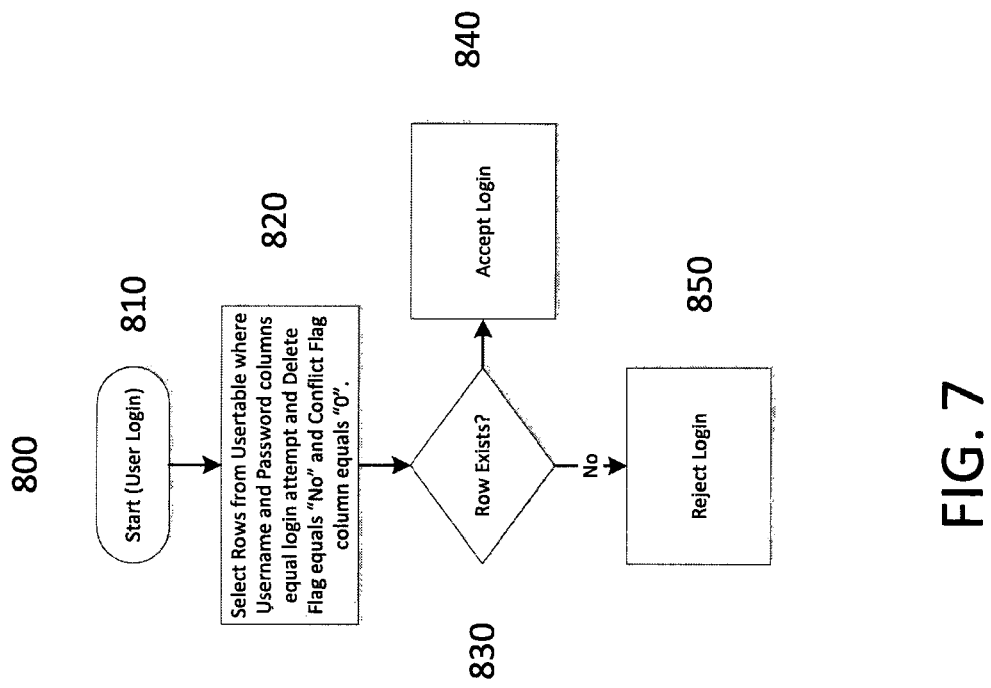
FIG. 7 depicts a login process according to an embodiment of the disclosure.

FIG. 7 depicts a login process 800 according to an embodiment of the disclosure. A user may use a client 250, for example, to attempt to login to a network cluster 100. A node 150 may receive a request to login 810 and may attempt to identify rows from a user object table (for example, Table 2) that correspond to the data contained in the login request 820. The node 150 may verify that the appropriate object data has not been flagged for deletion and/or does not have a conflict. If the table contains corresponding data 830 (indicating, in this example, that the username and password are valid), the node 150 may accept the login request 840. If the table does not contain corresponding data 830, the node 150 may reject the request 850.

Figure 8:
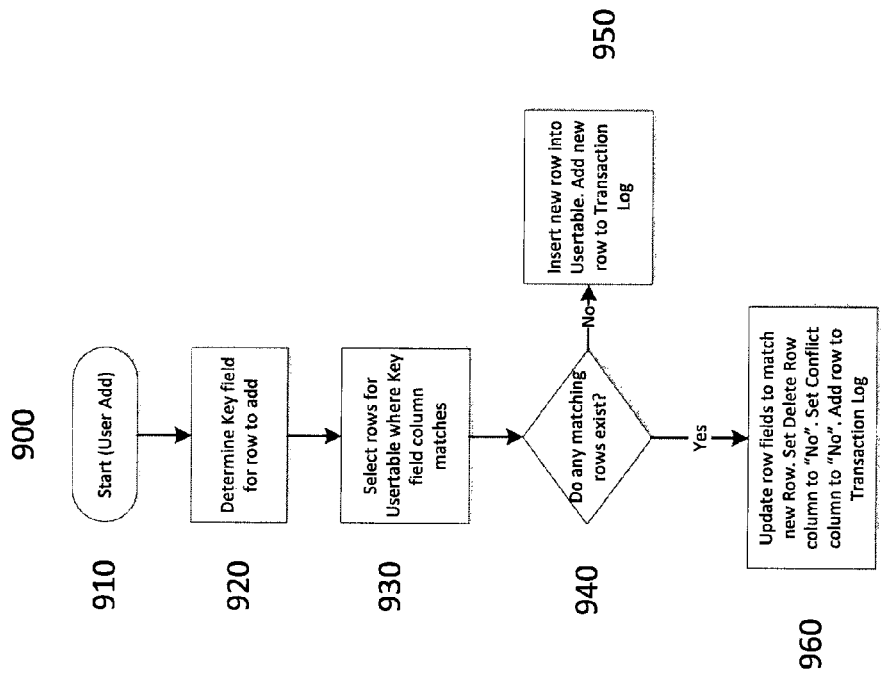
FIG. 8 depicts an add user process according to an embodiment of the disclosure.

FIG. 8 depicts an add user process 900 according to an embodiment of the disclosure. The process 900 may be initiated 910 by an administrator or by a user requesting to register with the network cluster 100, for example. The node 150 may determine a key field (i.e., User1, User2, User3 of Table 2) to add 920. For example, the node 150 may determine that a new user key may be added to the object table. The node 150 may attempt to find matching rows for the key field 930 (i.e., one or more rows that already contain the key). The node 150 may determine whether any matching rows exist in the table 940. If not, the node 150 may insert a row with the user data into the object table and add a row to the transaction log 950. If matching rows do exist 940, the node 150 may update the fields in the row to match the new row, set the delete and conflict flags to "no", and add a row to the transaction log 960.

Figure 9:
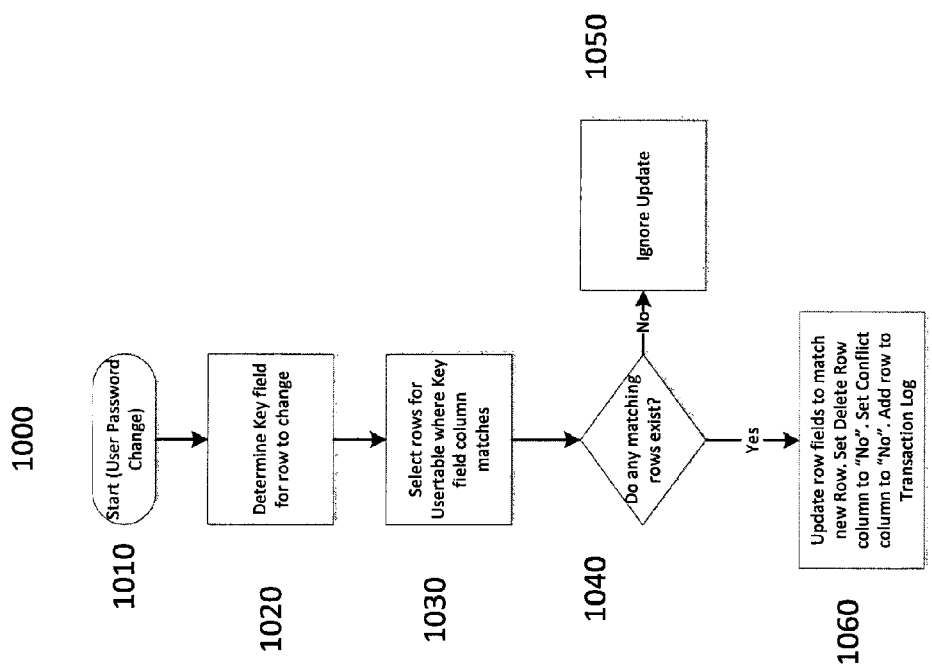
FIG. 9 depicts a password change process according to an embodiment of the disclosure.

FIG. 9 depicts a password change process 1000 according to an embodiment of the disclosure. The process 1000 may be initiated 1010 by an administrator or by a user, for example. The node 150 may determine an appropriate key field to modify 1020, for example the field corresponding to the user. The node 150 may select matching rows for the key field 1030. The node 150 may determine whether any matching rows exist in the table 1040. If not, the node 150 may ignore the update request 1050. The node 150 may ignore the request 1050 because if it does not have the key that is to be modified in its table, it cannot modify it. If matching rows do exist 1040, the node 150 may update the fields in the row to match the new row (for example by changing the data in the password payload), set the delete and conflict flags to "no", and add a row to the transaction log 1060.

Figure 10:
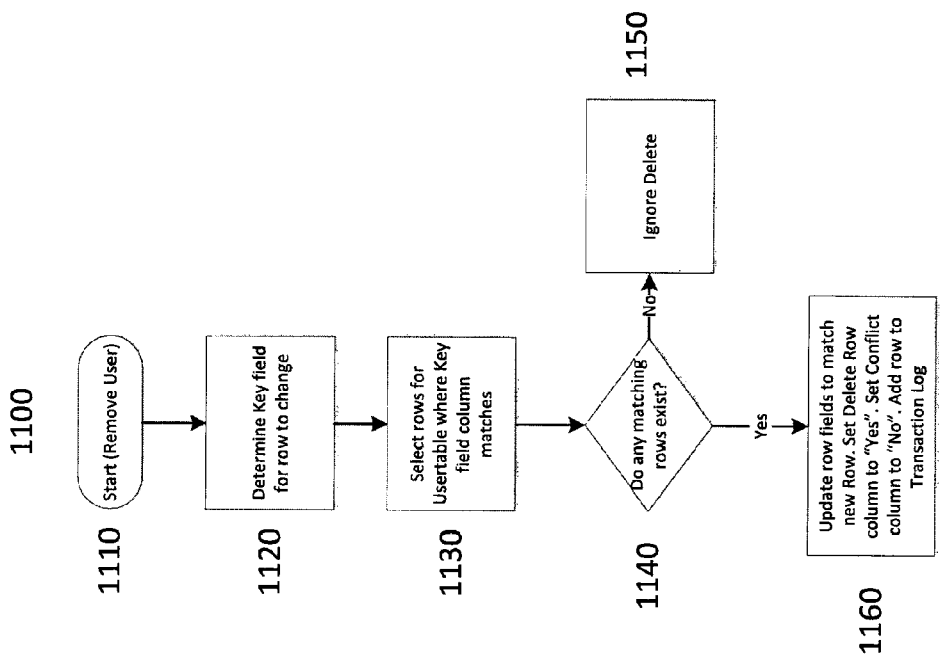
FIG. 10 depicts a remove user process according to an embodiment of the disclosure.

FIG. 10 depicts a remove user process 1100 according to an embodiment of the disclosure. The process 1100 may be initiated 1110 by an administrator or by a user, for example. The node 150 may determine an appropriate key field from the row to be changed 1120, for example the field identifying the user that is to be removed. The node 150 may select matching rows for the key field 1130, for example rows having a field matching the user ID to be deleted. The node 150 may determine whether any matching rows exist in the table 1140. If not, the node 150 may ignore the delete request 1150. If matching rows do exist 1140, the node 150 may update the fields in the row to match the new row, set the delete flag to "yes" and the conflict flag to "no", and add a row to the transaction log 1160.

Assume, for example, that a network cluster 100 has at least two nodes 150, server A and server B. If any of the processes 900, 1000, 1100 shown in FIGS. 8-10 are performed on server A, server A's object data and transaction logs may change. Synchronization may be performed between servers A and B to ensure that both servers have the same and most current data. In this example, server A's object data may be represented by Table 2 and server A's transaction log may be represented by Table 3. Server B's object data and transaction log may be represented by Tables 4 and 5, respectively, which are shown below.

TABLE 4

Server A Object Data

| Key | Payload | Vector | Delete Flag |
|---|---|---|---|
| User1 | Password1 | ServerA:1 | No |
| User2 | Password2 | ServerA:1 | No |
| User3 | Password3 | ServerA:1 | No |

TABLE 5

Server B Transaction Log

| Sequence | Vector | Key | Payload | Delete Flag | Conflict Flag |
|---|---|---|---|---|---|
| 1 | ServerA:1 | User1 | Password1 | No | 0 |
| 2 | ServerA:1 | User2 | Password2 | No | 0 |
| 3 | ServerA:1 | User3 | Password3 | No | 0 |

Server A may make a change to its object data, which may result in a change in its transaction log as well. See Tables 6 and 7, which show a password change for user 1 and an addition to the transaction log.

TABLE 6

Server A Object Data After Change

| Key | Payload | Vector | Delete Flag |
|---|---|---|---|
| User1 | New Password | ServerA:2 | No |
| User2 | Password2 | ServerA:1 | No |
| User3 | Password3 | ServerA:1 | No |

TABLE 7

Server A Transaction Log After Change

| Sequence | Vector | Key | Payload | Delete Flag | Conflict Flag |
|---|---|---|---|---|---|
| 1 | ServerA:1 | User1 | Password1 | No | 0 |
| 2 | ServerA:1 | User2 | Password2 | No | 0 |
| 3 | ServerA:1 | User3 | Password3 | No | 0 |
| 4 | ServerA:2 | User1 | New Password | No | 0 |

Figure 11:
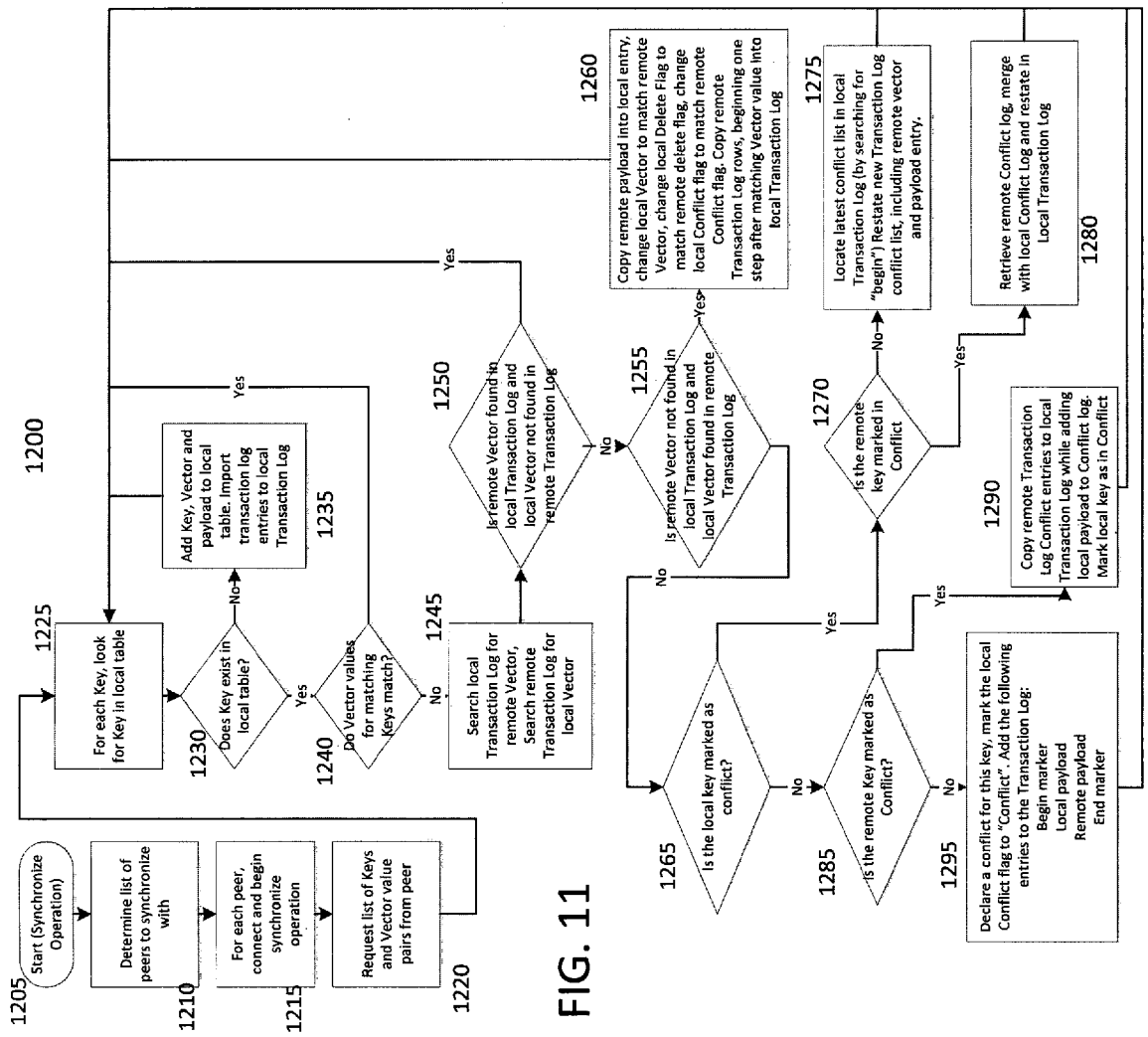
FIG. 11 depicts a data synchronization process according to an embodiment of the disclosure.

FIG. 11 depicts a data synchronization process 1200 according to an embodiment of the disclosure. A node 150 may utilize this process 1200 to synchronize its data with data on other nodes 150. For example, after the change represented by Tables 6-7 is made by server A, server B may synchronize its own object data and transaction log by server B scanning server A so it may receive the more up to date information known to server A. In some embodiments, some or all computers in a network cluster 100 may synchronize their data routinely and/or on command. This may enable the various computers to have the same data even if conflicts arise due to outages like those shown in FIGS. 4B-4C. A synchronization process may compare a vector for each matching key (for example each matching user name) between two nodes 150 being synchronized. If a key does not appear on the nodes 150 performing the synchronization scan, but does appear on the node 150 being scanned by the node 150 performing the scan, some or all of the object associated with the key may be copied to the node 150 performing the scan. The vector and transaction information may be copied to the scanning node 150, for example. The process may bring the scanning node 150 up to date with the node 150 being scanned.

A node 150 (such as server B in this example) may start its synchronization process 1205 and may determine a list of peers with which to synchronize 1210. The node 150 may synchronize with one or more peer computers, which may be other nodes 150 or other computers. The remaining process may represent a synchronization option with one peer, though the process may be repeated if the node 150 is to synchronize with multiple peers. The node 150 may connect to a peer computer 1215. To connect, the node 150 may initiate a communication session with the peer.

The node 150 may wait until it can obtain a synchronization lock on the requested data, then may send a message through the communication session to proceed. The peer may also obtain a synchronization lock on its own requested data, and the process may then proceed. A synchronization lock may be, for example, one or more mutual exclusion ("mutex") flags that may be set to indicate a synchronization operation is ongoing, which may prevent other computers from attempting to initiate a synchronization operation with the same computer. This may prevent data errors caused by concurrent synchronizations in some cases. For example, the node 150 may simultaneously allow incoming synchronization requests as well as make synchronization requests to other nodes 150. A situation may arise where the node 150 is updating its object data while reading object data to send to another node 150. Enforcing mutual exclusion in this situation may prevent data from being changed by one process while data is being read by another process. To provide mutual exclusion, two mutex flags, read mutex and write mutex, plus a write buffer may be used. The read mutex may allow multiple processes to read from an object data source at the same time. The write mutex may allow only a single process to write data to an object data source at a time. The write mutex may be mutually exclusive of the read mutex. A node 150 may first request a mutex, then wait until the requirements of the mutex can be fulfilled (for example, by waiting until a current operation ends) before the mutex is set.

A node 150 may initiate a synch request to a peer. The initiating node 150 may wait until it receives a go ahead signal from the peer. Upon receiving a go ahead signal, the initiating node 150 may request a read mutex for the object data source to be synchronized. When a peer receives a data synch request from an initiating node 150, it may obtain a read mutex for the requested data source. If any write activity is ongoing for the object data source, the read mutex may be released when the activity is complete. If no activity is ongoing for the object data source, the read mutex may be released immediately. The synchronization process may then commence. The initiating node 150 may write its object data source changes into a temporary write buffer. When the synchronization process completes, the initiating node 150 may release its read mutex, then request a write mutex. The initiating node 150 may write the contents of the temporary write buffer into its object data source while the write mutex prevents external data access. Note that if another process, such as a process initiated by a user to change a password, needs to change the object data source, it may similarly request a write mutex for the object data source to be changed.

The node 150 may request information such as a list of objects (which may include keys and payloads such as the username and password of the current example) and vector values from the peer 1220. For example, server B may request at least Tables 6-7 from server A. The node 150 may look for each key received from the peer in its own table 1225. If the node 150 does not have a key from the peer in its own table 1230, the node 150 may add the key, vector, and/or payload to its own table and may also import transaction log entries from the peer to its own log 1235. The node 150 may then move to the next key 1225. If the node's 150 table does have the key 1230, the node 150 may determine whether the vector values for the key on the node 150 and the peer match 1240. If they do, no update is necessary and the node 150 may move to the next key 1225.

In the example of server A and server B, the scanning node 150 (server B) may see that the two vectors for key "User1" do not match 1240. In some embodiments, the node 150 may determine this by looking at the key and vector data in the object table, without examining the actual payload to analyze for differences. At this point, the scanning node 150 (server B) may attempt to find the vector for the peer's key in its own transaction log and ask the peer to perform a search for server B's key 1245. The node 150 may next check whether the remote vector is found in its local transaction log and whether the local vector is not found in the remote transaction log 1250. If the answer to this is negative, the node 150 may next check whether the remote vector is not found in its local transaction log and whether the local vector is found in the remote transaction log 1255. If the results are as seen in Table 8, then this condition is true. Server A Found Vector from Server B TRUE Server B Found Vector from Server A FALSE Table 8: Vector Comparison

TABLE 8

| Vector Comparison | |
|---|---|
| Server A Found Vector from Server B | TRUE |
| Server B Found Vector from Server A | FALSE |

This condition may occur, for example, when data resembles the data shown in Tables 4-7 above. When this condition occurs, the local scanning node 150 may copy the object (including the vector) from the peer. This may result in changes to the local vector, delete flag, conflict flag, and/or other data in the object. The node 150 (scanning server B) may also request the transaction log entries from the peer (scanned server A), at least following the entry where the vector from the object in the node 150 was found, since it may be assumed that if server B does not have the searched vector, it does not have any subsequent vectors. The transaction log entries may be added to the transaction log in the node 150 (server B). The transaction log entries from the peer (server A) may be inserted after the matching vector value in the local transaction log 1260. The node 150 (server B) may then move to the next key 1225. In the example of servers A and B, server B may have the following object data and transaction log after performing these actions 1260:

TABLE 10

| Server B Object Data After Synchronization | | | |
|---|---|---|---|
| Key | Payload | Vector | Delete Flag |
| User1 | New Password | ServerA:2 | No |
| User2 | Password2 | ServerA:1 | No |
| User3 | Password3 | ServerA:1 | No |

TABLE 11

| Server B Transaction Log After Synchronization | | | | | |
|---|---|---|---|---|---|
| Sequence | Vector | Key | Payload | Delete Flag | Conflict Flag |
| 1 | ServerA:1 | User1 | Password1 | No | 0 |
| 2 | ServerA:1 | User2 | Password2 | No | 0 |
| 3 | ServerA:1 | User3 | Password3 | No | 0 |
| 4 | ServerA:2 | User1 | New Password | No | 0 |

A comparison of Tables 6 and 7 with Tables 10 and 11 reveals that servers A and B are synchronized.

Now suppose that server B found the vector from server A, and server A did not find the vector from server B (the decision at 1250 is positive). The results may be as seen in Table 9, for example:

TABLE 9

| Vector Comparison | |
|---|---|
| Server A Found Vector from Server B | FALSE |
| Server B Found Vector from Server A | TRUE |

If server B found the vector from server A, and server A did not have the vector from server B 1250 (see Table 8), server B may move to the next key. That is, server B would have a more up to date vector and may need to take no action. Server A could update its own table by running the process 1200 now being described with respect to server B.

In some cases, a node 150 may determine that neither of the cases represented by Tables 8 and 9 are true 1250, 1255 (see Table 12). This situation may represent a conflict wherein the node 150 and peer have different sets of direct inputs. For example, a user may have changed their password on two different nodes 150 while the nodes 150 were out of contact with one another.

TABLE 12

| Vector Comparison | |
|---|---|
| Server A Found Vector from Server B | FALSE |
| Server B Found Vector from Server A | FALSE |

In such a case, the nodes 150 may next check whether the local key is marked as conflicted 1265. A local key may be marked as conflicted if a previous synchronization 1200 performed by the local node 150 found a conflict with a different peer from the one with which the node 150 is currently synchronizing. If it is, the node 150 may check whether the remote key is marked as conflicted 1270. A remote key may be marked as conflicted if a previous synchronization 1200 performed by the peer found a conflict with a different peer. If the remote key is not marked as conflicted 1270, the node 150 may locate the latest conflict list in its local transaction log and restate a new transaction log conflict list that may include the remote vector and payload entry 1275 and may move to the next key 1225.

A transaction log may contain transaction records as seen in Tables 3, 5, 7, and 11, but it may also contain conflict lists. For example, see sequences 5-7 of Table 22 below. A conflict list may be generated when a conflict is found. The conflict list may be a log of unique conflicting payloads for a key that have been found. As seen in Table 22, a conflict list may begin with a sequence entry having a conflict flag marked (the conflict flag is marked as "Begin" or in some other way indicating that the sequence is beginning) The subsequent sequences may have their conflict flags marked as well. The last sequence in the conflict list may have its flag marked as "End" (or in some other way indicating that the sequence is ending), and intermediate sequences may have flags marked as well (for example, with "Conflict" in Table 22). After a conflict list ends, the transaction log may continue in the form shown in Tables 3, 5, 7, and 11 above (or if the conflict list is generated due to a conflict in the last table entry, the transaction log may end).

If the remote key is marked as conflicted 1270, the node 150 may retrieve the remote conflict log, merge it with the local conflict log, and restate the local transaction log 1280. The node 150 may then move to the next key 1225. In cases wherein the local key is not marked as conflicted 1265, the node 150 may check whether the remote key is marked as conflicted 1285. If the remote key is marked as conflicted 1285, the node 150 may copy the remote transaction log conflict entries to the local transaction log, add the local payload to the conflict log, and mark the local key as conflicted 1290. The node 150 may then move on to the next key 1225. If the remote key is not marked as conflicted 1285, the node 150 may declare a conflict and mark its local conflict flag as conflicted. The node 150 may also add a begin marker, local payload, remote payload, and/or end marker to its transaction log 1295 and may move on to the next key 1225. When all keys for a particular peer have been examined, the node 150 may move to another peer in its list. When the node 150 has synchronized with all peers in its list, the synchronization process 1200 may be complete.

Tables 13-16 may represent examples of conflicts between server A and server B.

TABLE 13

Server A Object Data

| Key | Payload | Vector | Delete Flag |
|---|---|---|---|
| User1 | New Password | ServerA:2 | No |
| User2 | Password2 | ServerA:1 | No |
| User3 | Password3 | ServerA:1 | No |

TABLE 14

Server A Transaction Log

| Sequence | Vector | Key | Payload | Delete Flag | Conflict Flag |
|---|---|---|---|---|---|
| 1 | ServerA:1 | User1 | Password1 | No | 0 |
| 2 | ServerA:1 | User2 | Password2 | No | 0 |
| 3 | ServerA:1 | User3 | Password3 | No | 0 |
| 4 | ServerA:2 | User1 | New Password | No | 0 |

TABLE 15

Server B Object Data

| Key | Payload | Vector | Delete Flag |
|---|---|---|---|
| User1 | My Password | ServerB:1 | No |
| User2 | Password2 | ServerA:1 | No |
| User3 | Password3 | ServerA:1 | No |

TABLE 16

Server B Transaction Log

| Sequence | Vector | Key | Payload | Delete Flag | Conflict Flag |
|---|---|---|---|---|---|
| 1 | ServerA:1 | User1 | Password1 | No | 0 |
| 2 | ServerA:1 | User2 | Password2 | No | 0 |
| 3 | ServerA:1 | User3 | Password3 | No | 0 |
| 4 | ServerB:1 | User1 | MyPassword | No | 0 |

The synchronization procedure 1200 from server B may inspect the data from server A as described above and may find a disparity in the vectors such that the result of the transaction log vector search is as seen in Table 12. In this example, server B may make the changes to its data indicated in Table 17 and may add the sequence of entries to its local transaction log indicated in Table 18. This may complete the update process for server B with respect to server A.

TABLE 17

Server B Object Data After Change

| Key | Payload | Vector | Delete Flag |
|---|---|---|---|
| User1 | MyPassword | ServerB:2 | Conflict |
| User2 | Password2 | ServerA:1 | No |
| User3 | Password3 | ServerA:1 | No |

TABLE 18

Server B Transaction Log After Change

| Sequence | Vector | Key | Payload | Delete Flag | Conflict Flag |
|---|---|---|---|---|---|
| 1 | ServerA:1 | User1 | Password1 | No | 0 |
| 2 | ServerA:1 | User2 | Password2 | No | 0 |
| 3 | ServerA:1 | User3 | Password3 | No | 0 |
| 4 | ServerA:2 | User1 | MyPassword | No | 0 |
| 5 | ServerB:2 | User1 | MyPassword | No | Begin |
| 6 | ServerA:2 | User1 | NewPassword | No | End |

At some point in the future, server A may synchronize with server B according to the process 1200 described above. In this example, server A may notice that one of the objects is in conflict. Server A may ask server B to scan its transaction log for the vector associated with "User1". If the vector is found, it may then be determined if the transaction entry with matching vectors is within a current conflict sequence in the transaction log. If it is not, the object and the transaction log entries after the point where the vector is found may be copied from server B to server A. In this example, the vector may be found within the current conflict sequence. This may cause server A to copy the object data from server B to server A. Server A may also copy the conflict sequence from the transaction log of server B to the transaction log of server A.

In another example, server B may have detected a conflict with server C, which may result in server B having the data found in Tables 19-20.

TABLE 19

Server B Object Data

| Key | Payload | Vector | Delete Flag |
|---|---|---|---|
| User1 | MyPassword | ServerB:2 | Conflict |
| User2 | Password2 | ServerA:1 | No |
| User3 | Password3 | ServerA:1 | No |

TABLE 20

Server B Transaction Log

| Sequence | Vector | Key | Payload | Delete Flag | Conflict Flag |
|---|---|---|---|---|---|
| 1 | ServerA:1 | User1 | Password1 | No | 0 |
| 2 | ServerA:1 | User2 | Password2 | No | 0 |
| 3 | ServerA:1 | User3 | Password3 | No | 0 |
| 4 | ServerB:1 | User1 | MyPassword | No | 0 |
| 5 | ServerB:2 | User1 | MyPassword | No | Begin |
| 6 | ServerC:2 | User1 | 1234 | No | End |

When server A scans server B, it may find a conflict because the transaction log vector search may yield the results shown in Table 12. Server A may see that server B's object is already in conflict (in this example, it is in conflict with data on server C). Server A may respond by incrementing the local object's vector, ingesting the transaction log entries from server B, and/or adding its own object to the conflict sequence, which may result in server A having the data shown in Tables 21-22.

TABLE 21

Server A Object Data After Synchronization

| Key | Payload | Vector | Delete Flag |
|---|---|---|---|
| User1 | NewPassword | ServerA:3 | Conflict |
| User2 | Password2 | ServerA:1 | No |
| User3 | Password3 | ServerA:1 | No |

TABLE 22

Server B Transaction Log

| Sequence | Vector | Key | Payload | Delete Flag | Conflict Flag |
|---|---|---|---|---|---|
| 1 | ServerA:1 | User1 | Password1 | No | 0 |
| 2 | ServerA:1 | User2 | Password2 | No | 0 |
| 3 | ServerA:1 | User3 | Password3 | No | 0 |
| 4 | ServerB:1 | User1 | MyPassword | No | 0 |
| 5 | ServerB:2 | User1 | MyPassword | No | Begin |
| 6 | ServerC:2 | User1 | 1234 | No | Conflict |
| 7 | ServerA:3 | User1 | NewPassword | No | End |

If servers B and C scan server A, they may find the vector for their local objects in the transaction log of server A. This may indicate that servers B and C may ingest the conflict sequence and new object vector from server A without making any further changes to their own conflict sequences.

In some embodiments, conflict resolution may be handled by an administrator. In embodiments wherein administrators may resolve conflicts manually, an administrator may learn about a conflict from a message triggered by a conflict. When a conflict flag is set during a synchronization routine 1200, the node 150 may generate a message which may contain data about the conflict. For example, an administrator may view the conflict sequence for the object in conflict, which may be included in the message in some cases. The administrator may be able to choose an object generation with which to resolve the conflict. The administrator's actions may result in a new object change being issued. This change may be similar to a password change performed by an individual computer as described above. This change may change the delete flag in the object to 0 (if it is 1) and may increment the object vector. This may also add a new entry to the transaction log. When other nodes 150 scan the computer used to make the change, the vector related to the object in conflict may be found in the computer used to make the change. The object in the computer used to make the change is not in conflict, so the transaction log entries beyond the conflict sequence related to the vector may be ingested by a scanning node 150. The new object data and vector may also be copied over to the scanning node 150, as described above.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, while the above examples are presented in the context of nodes 150 connecting to one another, it will be understood that the systems and methods described herein can be performed by any interconnected computers. Thus, the present embodiments should not be limited by any of the above-described embodiments In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method for synchronizing data comprising:
   connecting, with a computer, to a peer computer via a network connection;
   receiving, with the computer, a remote table from the peer computer, wherein the remote table comprises an object comprising a vector, said object further comprising a conflict flag;
   determining, with the computer, whether the object is present in a local table;
   determining, with the computer, whether the vector in the remote table and the vector in the local table match when the object is present in the local table;
   determining, with the computer, whether a record of a change to the object is present in a local transaction log when the vectors do not match;
   receiving, with the computer, data from the peer computer indicating whether a record of a change to the object is present in a remote transaction log when the vectors do not match;
   replacing, with the computer, the vector in the local table with the vector in the remote table and recording, with the computer, a change to the object in the local transaction log when the record of the change to the object in the local transaction log is less recent than the record of the change to the object in the remote transaction log;
   flagging, with the computer, the conflict flag in the local table to indicate a conflict when the vectors do not match;
   generating, with the computer, an alarm when the vectors do not match;
   changing, with the computer, the vector in the local table; and recording, with the computer, the change to the vector in the local transaction log;

recording, with the computer, the record of the change to the object in the remote transaction log into the local transaction log when the vectors do not match, wherein the record of the change to the object in the remote transaction log comprises peer conflict data indicating a conflict when a change to the vector in the remote table has been made and a different change to the vector in a table associated with a third computer has been made;

recording, with the computer, object data from the local table in the local transaction log when the vectors do not match;

determining, with the computer, a plurality of peer computers with which to synchronize; and selecting, with the computer, one of the plurality of peer computers to which to connect;

setting, with the computer, a mutex flag when the connection to the peer computer is made; and receiving, with the computer, a ready message from the peer computer.

2. The method of claim 1, further comprising adding, with the computer, the object, comprising a key and a delete flag, to the local table when the object is not present in the local table; and replacing, with the computer, a delete flag in the local table with a delete flag in the list.

* * * * *